(12) United States Patent
Thielow

(10) Patent No.: US 7,722,706 B2
(45) Date of Patent: May 25, 2010

(54) DEVICE FOR THE EXTRACTION OF WATER FROM ATMOSPHERIC AIR

(75) Inventor: Frank Thielow, Bodnegg (DE)

(73) Assignee: Logos-Innovationen GmbH, Bodnegg (DE)

( * ) Notice: Subject to any disclaimer, the term of this patent is extended or adjusted under 35 U.S.C. 154(b) by 1080 days.

(21) Appl. No.: 10/558,238

(22) PCT Filed: May 26, 2004

(86) PCT No.: PCT/DE2004/001102

§ 371 (c)(1),
(2), (4) Date: Apr. 10, 2006

(87) PCT Pub. No.: WO2004/106649

PCT Pub. Date: Dec. 9, 2004

(65) Prior Publication Data

US 2006/0278089 A1    Dec. 14, 2006

(30) Foreign Application Priority Data

May 26, 2003  (DE) ................. 103 24 114
Sep. 23, 2003  (DE) ................. 103 44 306

(51) Int. Cl.
*B01D 53/14*    (2006.01)

(52) U.S. Cl. ............................ 95/211; 95/231; 96/272; 96/274; 96/296

(58) Field of Classification Search ........... 95/210–211, 95/231; 96/290, 295–296, 272, 274; 261/103, 261/106–107

See application file for complete search history.

(56) References Cited

U.S. PATENT DOCUMENTS

| | | | | |
|---|---|---|---|---|
| 1,855,615 A | * | 4/1932 | Sperr, Jr. ...................... 95/93 |
| 3,318,107 A | | 5/1967 | Riley et al. |
| 3,385,575 A | * | 5/1968 | Hall ....................... 261/112.1 |
| 3,477,282 A | * | 11/1969 | Ohlheiser ...................... 73/76 |
| 3,719,327 A | * | 3/1973 | McMahan |
| 3,748,828 A | * | 7/1973 | Lefebvre |
| 3,765,447 A | * | 10/1973 | Cornell |
| 3,777,456 A | | 12/1973 | Lund |
| 4,223,838 A | * | 9/1980 | Maria-Vittorio-Torrisi .. 239/109 |
| 4,285,702 A | * | 8/1981 | Michel et al. |

(Continued)

FOREIGN PATENT DOCUMENTS

DE    2 305 652    8/1974

(Continued)

*Primary Examiner*—Duane Smith
*Assistant Examiner*—Ives Wu
(74) *Attorney, Agent, or Firm*—Breneman & Georges

(57) ABSTRACT

A device is provided for extracting water from atmospheric air (8) having a free-flowing adsorbent or absorbent (3, 13), in particular a saline solution (3), having a hygroscopic salt for the adsorption or absorption of water, the adsorption or absorption being provided at least along an adsorption or absorption section (7), which realizes a high yield of (potable) water per unit volume of the structure or of the absorbent/adsorbent (3), a decrease in the assembly effort and a stabilization of the process. This is achieved according to the invention in having a free-flowing adsorbent (3, 13) or absorbent (3, 13) disposed at least along the adsorption or absorption section (7) essentially on a guide element (1, 16, 19, 22, 24) for guiding the adsorbent (3) or absorbent (3), in particular on a presettable track.

18 Claims, 12 Drawing Sheets

U.S. PATENT DOCUMENTS

| | | | |
|---|---|---|---|
| 4,313,312 A | | 2/1982 | Ito et al. |
| 4,365,979 A | * | 12/1982 | Takeyama et al. ............. 96/123 |
| 4,957,519 A | * | 9/1990 | Chen ............................ 96/326 |
| 4,980,098 A | * | 12/1990 | Connery .................. 261/112.1 |
| 5,535,989 A | * | 7/1996 | Sen ......................... 261/112.1 |
| 5,538,545 A | * | 7/1996 | Dauber et al. ................. 96/153 |
| 6,375,717 B1 | * | 4/2002 | Peteln ......................... 95/211 |
| 6,436,172 B1 | * | 8/2002 | Rabiger |
| 6,582,498 B1 | * | 6/2003 | Sass et al. |
| 7,309,062 B2 | * | 12/2007 | Lin ............................ 261/154 |

FOREIGN PATENT DOCUMENTS

| | | |
|---|---|---|
| DE | 28 10 241 | 9/1979 |
| DE | 26 60 068 | 2/1980 |
| DE | 285 142 | 12/1990 |
| DE | 198 50 557 | 5/2000 |
| DE | 103 09 110 A1 | 9/2004 |
| GB | 759641 | 10/1956 |

* cited by examiner

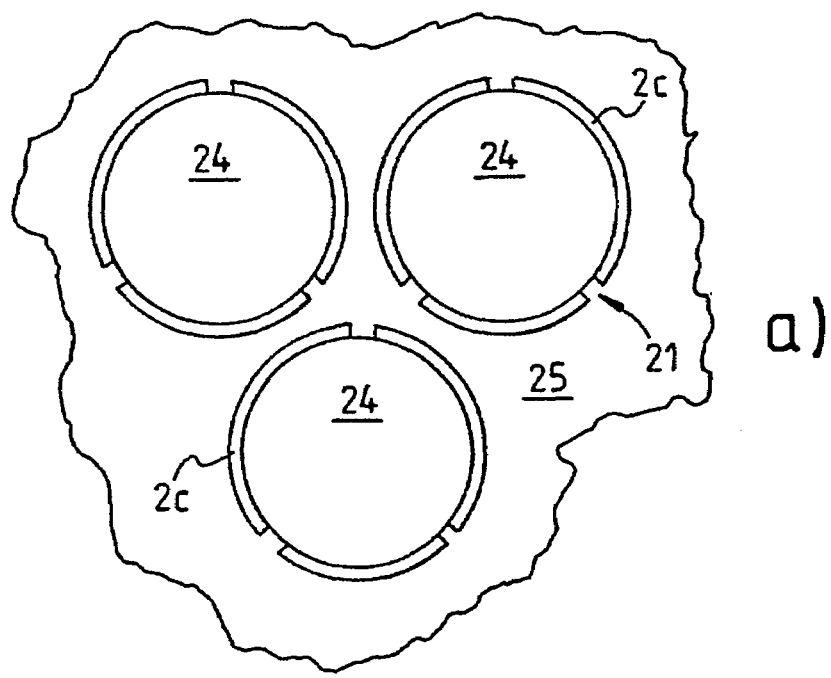
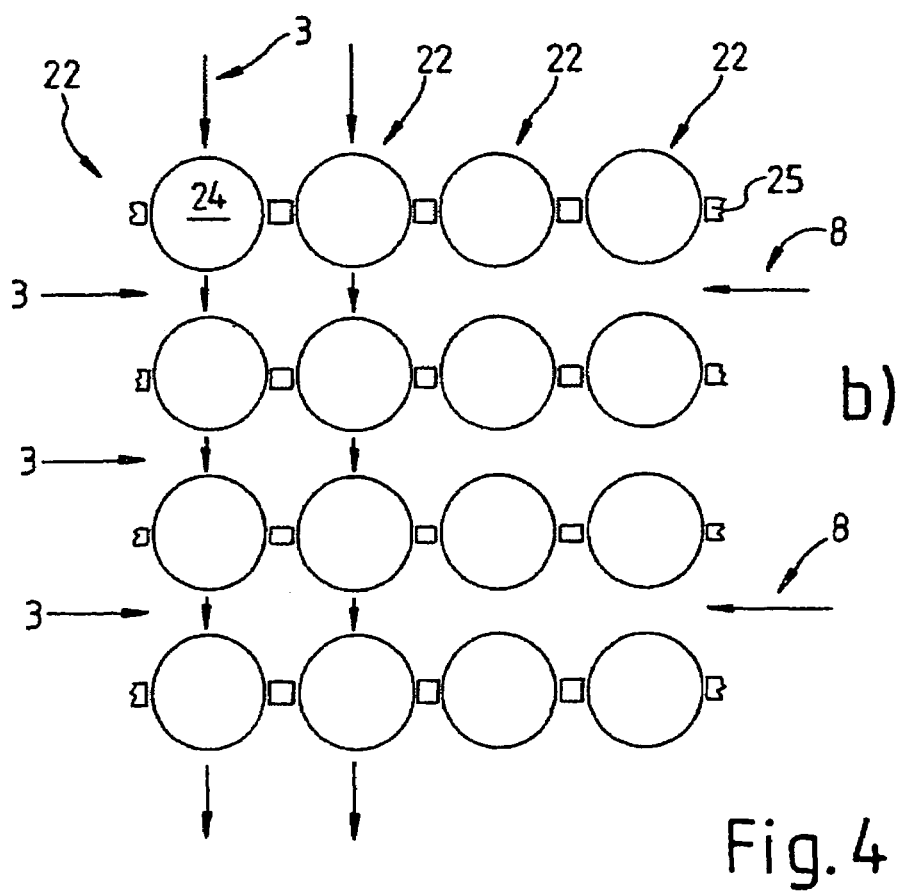
Fig. 4

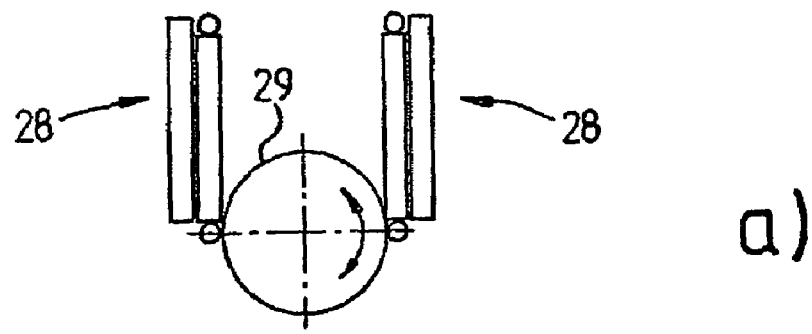
a)
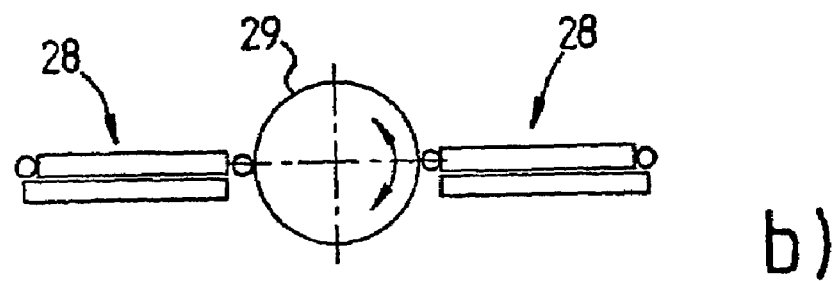
b)
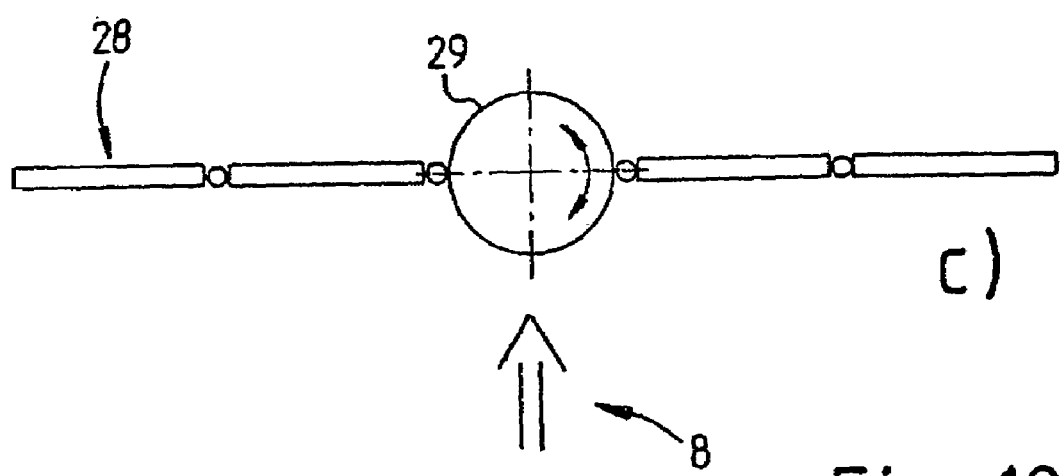
c)
Fig. 12

DEVICE FOR THE EXTRACTION OF WATER FROM ATMOSPHERIC AIR

CROSS REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

REFERENCE TO A "MICROFICHE APPENDIX"

Not Applicable

BACKGROUND OF THE INVENTION

1. Field of the Invention

The invention relates to a device for extracting water from atmospheric air having a free-flowing adsorbent (3, 13) or an absorbent (3, 13) in particular a saline solution (3, 13), having a hygroscopic salt for the adsorption or absorption of water, the adsorption or absorption being provided at least along an adsorption or absorption section (7). More particularly the invention pertains to a guide element (1, 16, 19, 22, 24) for guiding the adsorbent or absorbent and at least one metering unit having at least one orifice (6) for adding the saline solution (3) to the guide element and a metering unit for pressurizing the saline solution (3).

2. Description of Related Art Including Information Disclosed Under 37 CFR 1.97 and 1.98

At many places in the world, particularly in semi arid or arid regions, such as, for example, in parts of Israel, Egypt, the Sahel zone or numerous hot deserts, which are at a significant distance from the sea, potable water supplies are not available, at least nor all year round. In addition to the transport of potable water, there is here only the possibility of providing potable water from moist air.

Condensers are already known in many ways for extracting condensable water from atmospheric air having a refrigeratorable cold store, the relatively moist atmospheric air being cooled below the dew point (see DE-C-28 10 241, DD 285 142 A5).

In addition, devices are also known which bind atmospheric water in an absorption phase by means of an adsorbent or absorbent material such as a salt, e.g. sodium chloride or the like. In this case the salt or the corresponding saline solution is generally stored in a liquid container, the water level or the topside, viewed in a vertical direction, of the salt or of the brine being considered as water-adsorbent or absorbent surface. In a desorption phase, this salt-water solution or brine is dehydrated for extracting the potable water and the salt is made available again for absorption (see, e.g., DE-C 2 660 068, DE 198 50 557 A1).

However, disadvantages of these methods or devices are the comparatively large construction size and the relatively low yield of potable water per unit volume of brine.

BRIEF SUMMARY OF THE INVENTION

In contrast to the prior art it is an object of the invention to provide a device for extracting water from atmospheric air having a free-flowing adsorbent or absorbent, in particular a saline solution having a hygroscopic salt for the adsorption or absorption of water, the adsorption or absorption being provided at least along an adsorption or absorption section, which device achieves a high yield of (potable) water per unit volume of the construction or of the absorbent/adsorbent, and possibly a stabilization of the process.

An object of the invention is achieved starting with a device having a free-flowing adsorbent (3, 13) or an absorbent (3, 13) in particular a saline solution (3, 13) having a hygroscopic salt for the adsorption or absorption of water, the adsorption or absorption being provided at least along an adsorption or absorption section (7). More particularly the invention pertains to a guide element (1, 16, 19, 22, 24) for guiding the adsorbent or absorbent and at least one metering unit having at least one orifice (6) for adding the saline solution (3) to the guide element and a metering unit for pressurizing the saline solution (3).

Advantageous embodiments and developments of the invention are also provided by constructing the guide element (1, 16, 19, 22, 24) in a U shape or a V shape, disposing the saline solution (3) as a liquid film on the guide element, providing a distributor element (10, 24) on the guide element (1, 16, 19, 22, 24) for the flat distribution of saline solution, constructing the distribution element (10, 24) as a spherical, cubic, conical, oval, egg-shaped, cuboidal and/or a polygonal body (10, 24) forming the distribution element (10, 24) as a net of a non woven or woven fabric, a leather hide, small hairs, fibers, pores, grooves, craters and/or hollows, forming the guide element (1, 16, 19, 22, 24) in a plurality of bodies like a string of pearls, forming the guide element (1, 16, 19, 22, 24) as a rod 16 having numerous furrows (17) slots and/or grooves oriented along the rod axis, constructing the guide element as a corrugated plate having numerous corrugations (17) slots and/or grooves, providing for the transport of the adsorbent or absorbent along the guide element (1, 16, 19, 22, 24) in a substantially vertical direction, providing numerous guide elements (1, 16, 19, 22, 24) providing for brine drops along the adsorption or absorption section (7) for transporting the saline solution (3) having a least one metering unit with a least one metering orifice (6) for adding saline solution (3) to the guide element (1, 16, 19, 22, 24), having at least one pressure-generation unit for pressurizing the saline solution (3) disposed in a brine store (2) providing at least one heat-exchange unit for use of heat energy for desorption, providing for height and/or width adjustment of the device, mounting the device so as to be at least in part rotatable around an axis (27), providing an outer casing that is mounted to be rotatable around an axis (27), providing at least one air filter (15) for filtering atmospheric air (8) into the device, providing through-flow orifices having a smaller cross sectional area than the cross sectional area of the metering orifices and employing an adsorbent (3, 13) or absorbent (3, 13) in the device.

Accordingly, an inventive device is distinguished in that the free-flowing adsorbent or absorbent is disposed at least along the adsorption or absorption section essentially on a guide element or a retention rail for guiding the adsorbent or absorbent, in particular on a presettable track. Using an inventive guide element, assembly and also retention or adhesion to the guide element is effected in such a manner as to substantially prevent disadvantageous blowing during flow through of the adsorption or absorption section due to the action of wind.

Generally, shifting or motion/flowing of the adsorbent or absorbent along the adsorption or absorption section is provided, so that the motion or flowing of the adsorbent or absorbent is guided or conducted.

Guiding in the context of the invention is taken to mean that the adsorbent or absorbent is guided or conducted at least in two, advantageously in three, directions orientated orthogonally to one another. This means that especially in the case of a guide element orientated at least in one direction, substantially vertically, owing to gravity, the adsorbent or absorbent is guided in what is termed the Y direction. In addition, by means of the guide element, the adsorbent or absorbent is guided or directed at least in what is termed the X direction and/or what is termed the Z direction. The Y, X or Z directions are here in each case disposed orthogonally to one another in a generally known manner. For example, the adsorbent or absorbent, in the case of a virtually vertically orientated and planar guide element, is guided or conducted, in addition to the Y direction, in addition also in the X direction or the Z direction in the meaning given above. In the case of a, e.g., virtually vertically orientated linear guide element, such as a rod, rope, etc., the adsorbent or absorbent, in addition to the Y direction, is also guided or conducted into the X direction and the Z direction.

Advantageously, the adsorbent or absorbent is conducted or constructed on an outer surface or externally and/or as casing, of the guide element. This makes possible an advantageous contact with the atmospheric air.

If appropriate, an adhesion element having an adhesion surface for adhesion of the free-flowing adsorbent or absorbent is provided at least along the adsorption or absorption section. By this means the adsorbent or absorbent is retained on the adhesion element in such a manner that it cannot be removed or blown away from the adhesion element by the force of wind or the like.

In general, the adhesion element or guide element can be constructed so as to be substantially linear or else corrugated, curved and/or bent, so that it can be adapted flexibly to the most varied circumstances or spatial conditions.

By means of this measure, according to the invention a substantially exactly defined track of the adsorbent or absorbent during water uptake from the air is achieved, the track of the adhesion element or guide element corresponding essentially to this, or being preset by this. As a result, without great expenditure, a disadvantageous change in the adsorption or absorption section of the adsorbent or absorbent is effectively prevented, so that as optimum as possible water uptake is achieved.

The adhesion element, or the retention rail, or the guide element, is advantageously constructed as string and/or rope and/or wire and/or woven fabric and/or chain and/or tube and/or rod and/or pole. By this means, an adhesion element or guide element which is particularly simple to produce or assemble can be achieved. The adsorbent or adsorbent can be disposed in the form of a (partial) casing around the adhesion element or guide element, so that a particularly high surface area actively absorbing or absorbing water is achieved. This produces an actively water-absorbing surface area of the saline solution which is as large as possible.

In a particular variant of the invention, the adhesion element or guide element or the retention rail can be constructed as U- and/or V-shaped element or rail. By means of this variant of the invention, a particularly exact direction of the adsorbent or absorbent on the preset track during the adsorption/adsorption can be achieved.

In an advantageous embodiment of the invention, the adsorbent/absorbent or the saline solution is disposed at least on the retention rail or on the adhesion element/guide element as liquid film or liquid wetting. By this means, a relatively extensive water-absorbing surface can be achieved. Furthermore, an advantageous ratio of liquid volume to actively water-absorbing liquid surface area is achieved. This leads to a particularly effective water extraction by the device according to the invention.

Generally, there is the connection that the greater the water-absorbing surface area of the saline solution is, the more advantageous or greater is the water absorption and/or the efficiency of the inventive device. Generally, maximizing the water-absorbing surface area of the saline solution, in particular per unit volume, is to be aimed at.

Preferably, the adhesion element/guide element or the retention rail has at least one distribution element for the planar distribution or for the surface enlargement of the saline solution. By this means, the planar development of the liquid film or the wetting of the wall, can advantageously be implemented. Corresponding designs of the adhesion element or guide element achieve in a particularly simple manner a correspondingly advantageous water-absorbing surface.

In a particular development of the invention, the distribution element is constructed as spherical and/or cubic and/or conical and/or oval and/or cuboidal and/or polygonal body. The absorbent/adsorbent or the saline solution flows past such an adhesion element or guide element or bodies disposed on the retention rail, so that its or their surface area is critically enlarged and thus the water uptake is improved.

Advantageously, the distribution element comprises a net and/or a nonwoven and/or a woven fabric and/or a leather hide and/or small hairs and/or fibers and/or pores and/or grooves and/or craters and/or hollows. For example, in the case of a nonwoven, woven fabric, leather or the like, the extensive implementation of the surface according to the invention is advantageously implemented, in particular, by means of capillary forces and/or surface effects.

The distribution element can consist, e.g., of plastic, clay and/or glass. For example, the distribution element or the bodies can be glued, sprayed, pressed or comparatively simply fixed to the adhesion element or guide element. Between two distribution elements, spaces such as sleeves or the like may be provided.

If appropriate, the distribution element is implemented as porous, sponge-like or comparably permeably constructed body. Possibly, the surface of the distribution element can be roughened or made to be microporous. In general, it is advantageous to adapt the adhesion element or guide element and/or distribution element to the adsorbent/absorbent or the saline solution, e.g. to the viscosity, surface tension, etc.

In an advantageous variant of the invention, the adhesion element or guide element is constructed as what is called a string of pearls having numerous bodies. An advantageously simple surface enlargement can be achieved by appropriately numerous bodies which are disposed along the guide element.

Possibly, the adhesion element or guide element or the retention rail is constructed having advantageous guide structures, in particular as a rod having numerous furrows and/or slots and/or grooves orientated in the direction of the rod axis. An appropriately furrowed rod, e.g., likewise has a relatively high surface area and is also simple to produce, e.g. as injection-molded or deep-drawn element. In addition, the guide structures improve the guidance or retention of the adsorbent/absorbent to the guide element according to the invention.

Especially, alternatively to this, the adhesion element or guide element or the retention rail can be constructed having advantageous guide structures, in particular as a corrugated plate having numerous corrugations and/or slots and/or grooves. A corresponding plate can be produced at least just as simply, and in addition also has a relatively large surface area.

Generally, the corrugations and/or furrows and/or slots and/or grooves can have hollows and/or bulges and/or humps or the like, so that the surface area of the corresponding guide element is additionally increased, which leads to an even better water uptake by the adsorbent/absorbent.

In addition, the inventive bodies, hollows, bulges or humps of the adhesion element or guide element extend the adsorption/absorption section and thus advantageously the residence time of the adsorbent/absorbent, which results in an improved water uptake of the apparatus. In principle, other alternative and/or further advantageous surface-area-increasing measures or elements can also be used according to the invention.

In a preferred manner, the transport direction of the adsorbent or absorbent is orientated along the adhesion element or guide element or along the retention rail essentially in a vertical direction. By this means, an advantageous transport of the free-flowing adsorbent/absorbent or the saline solution can be achieved along the adsorption section by means of gravity. This measure makes possible a particularly simple operation of the inventive device.

In a particular variant of the invention, numerous adhesion elements or guide elements or retention rails are provided. By this means the water-absorbing surface area according to the invention can be advantageously enlarged to a particularly great extent or in a simple manner.

If appropriate, a plurality of vertically or horizontally orientated adhesion elements or guide elements are disposed in a horizontal direction next to one another. Preferably, numerous distribution elements are disposed in a vertical direction one above the other. By this means, an advantageous cascade can be achieved, the saline solution flowing or being transported by means of gravity from a first distribution element to a second distribution element disposed beneath, etc. For example, the saline solution flows along the surface of the adhesion element or guide element, the adsorbent/absorbent or the saline solution flowing over one distribution element or inventive body after the other.

In a particular development of the invention, brine drops are provided at least along the adsorption or absorption section for transporting the saline solution. This can mean, inter alia, that the saline solution drips with as many drops as possible, e.g., from at least one brine store, preferably disposed in the upper region of the inventive device, onto the adhesion element/guide element, or the numerous adhesion elements/guide elements, which drops slide downward along the adhesion element or guide element. The brine of the brine store is generally a virtually saturated saline solution.

Advantageously, in the inventive variants, the water-absorbing surface of the saline solution comprises at least the drop surface. For example, in the case of several million drops per cubic meter, this advantageous measure gives a significant enlargement of the water-absorbing surface area which further improves the yield or the efficiency of the inventive device.

Preferably, at least one metering unit having at least one metering orifice is present for adding the brine drops to a guide element. In this case, in particular from the brine store, the saline solution is added by means of the metering orifice of the adhesion element or guide element. A metering unit enables, especially together with an open-loop or closed-loop control unit, a substantially automated mode of operation of the device according to the invention. For this, advantageously, the most varied sensors and actuators are to be provided which measure at least relative atmospheric humidity, temperature, flow rate, brine concentration, flow velocity, air pressure and/or brine pressure.

In an advantageous embodiment of the invention, the metering unit has at least one pressure-generation unit for pressurizing the saline solution disposed in a brine store. Using a corresponding pressure-generation unit, such as, e.g., a pump, the saline solution in the brine store can be pressurized for example in such a manner that the amount of saline solution added can be adapted, in particular, to the relative atmospheric humidity.

Preferably, the addition is performed in such a manner that the saline solution, pulsed, gives off numerous drops through numerous metering orifices at correspondingly numerous adhesion elements or guide elements. For this, the pressure-generation unit pressurizes the saline solution in a pulsed manner, or alternately at a high pressure and a lower pressure. This ensures that substantially individual drops slide down the adhesion elements or guide elements one after the other and thus form an advantageously large active surface area or slide from distribution element to distribution element, in particular from body to body, according to the invention.

For example, the number of brine drops per unit time is adapted to the relative humidity of the atmospheric air, the more brine drops are generated or are added to the adhesion elements/guide elements, the higher is the relative atmospheric humidity. Advantageously, this adaptation, in particular of the control of the pressure generated by the pressure-generation unit, can be combined with a wind energy-generation unit such as a wind turbine or the like.

In a particular development of the invention, at least one air filter is provided for filtering the atmospheric air flowing into the device. This can at least partially prevent or reduce contamination of the adsorbent/absorbent by dust, windborne sand or the like, which makes possible a relatively fault-free mode of operation of the device according to the invention.

Preferably, the air filter has through-flow orifices, the through-flow orifices having a smaller cross sectional area than the cross sectional area of the metering orifices. By means of this measure, impairment or blockage of the metering orifices by particles introduced with the atmospheric air, such as windborne sand or the like, can be very largely prevented. This decisively increases the operational reliability of the inventive device, without significant expenditure. This measure is also of particular advantage in a device according to application 103 09 110.6 of the applicant.

In principle, the saline solution flowing down along the adhesion element/guide element or the distribution element generally automatically cleans it from contamination such as dust deposits, windborne sand, etc., as a result of which a self-cleaning system can be achieved. This additionally increases the operation reliability of the plant.

Advantageously, a holding device of the adhesion elements or guide elements has at least one support column. Preferably, the adhesion elements or guide elements are disposed in at least one through-flow element constructed as a vane, in particular the vane being able to swing together with the holding device, or about an axis of rotation. Preferably, two vane elements are provided which are able to rotate about an intermediately disposed axis of rotation and/or holding device or support column.

For example, the support column is disposed in the central region of the plant or in the region of an axis of rotation. If appropriate, the support column is constructed as an extrusion pressed element, as a result of which a relatively economically expedient design of the holding device can be effected.

In principle, the plant or the vane can be constructed so as to be able to swing as a function of the wind direction. For this, an advantageous control unit, in particular having a wind direction-detection element, is present. For example in the case of relatively high wind strengths, such as in a storm, etc., the control unit can place the plant or the vane(s) with a relatively small, in particular closed, cross sectional area into the wind. At relatively low wind strengths, or in a virtually still wind, the plant or the vane(s) is/are to be placed with a relatively large through-flowable cross sectional area into the wind.

Preferably, the saline solution is fed at a first, in particular virtually saturated, salt concentration of the adhesion element or guide element from the brine store. For example, the holding device, in particular the support column, comprises the brine store. In an advantageous embodiment of the invention, at least one removal element for removing the saline solution at a second salt concentration is provided, the second salt concentration being substantially lower than the first salt concentration.

If appropriate, the saline solution flows through or impinges a plurality of adhesion elements or guide elements in series, and is stored or collected in a collecting element or second brine store at the second salt concentration. The adhesion elements or guide elements connected in series form, at least together with the brine feeder and the collecting element, an advantageous module. Advantageously, a plurality of modules are provided, if appropriate, viewed in the vertical direction, disposed one above the other and/or adjacently. Advantageously, the modules are connected, and the saline solution flows through them, in parallel. In this case the modules or individual saline solutions are generally combined, the saline solutions of the individual modules mixing and if appropriate being intermediately stored in a storage reservoir.

Preferably, at least one concentration unit is provided for concentrating the saline solution from the second salt concentration to the first salt concentration. For example, in this case, the water is at least in part desorbed. By means of this measure, advantageous water or potable water is separated off from the saline solution and can be fed to a use or utilization. Frequently, the water extracted by this means is used as potable water and/or irrigation water.

Advantageously, the concentration unit comprises at least one mechanical filter, sieve or the like, which effectively removes or retains contaminants or particles, in particular upstream of the concentration stage in the direction of flow.

If appropriate, the concentration unit has at least one cyclone and/or a semipermeable membrane for producing the water or potable water. Preferably, the concentration unit comprises at least one evaporator for at least partial evaporation of the saline solution. In this case, in particular, an if appropriate refrigeratable condensation unit is provided for condensing the water vapor and producing the water.

The use of an evaporator has in particular the advantage that in arid or semiarid areas, heat energy or solar energy is available particularly simply in a sufficient amount and using extensively proven techniques. Frequently, in this case, use is made of corresponding energy stores in the most differing variants.

In general, e.g. a substantially continuous day and/or night operation of the device according to the invention can be effected.

In principle, using the invention, a marked enlargement of the surface area actively absorbing the atmospheric water can be achieved, which leads to a decisive improvement in the yield per unit volume of the device. Possibly, a substantially greater throughput or throughflow of atmospheric air per unit time can be achieved, so that the yield per unit time can be correspondingly increased. This leads to a substantial increase in the efficiency or economics of the inventive device.

Preferably, a skin is formed for encasing or protecting the device and/or the adhesion elements/guide elements or modules, at least in part as a skin which can be orientated into a wind direction. By this measure, an adaptation to unfavorable atmospheric conditions such as storm etc, can be effected. For example, at least a part of the skin can be implemented from numerous lamellae which are mounted so as to be able to rotate. These lamellae are generally directed into the wind direction, so that an advantageous directing of the wind or of the air to be dehydrated can be effected.

Alternatively, or in combination therewith, can also be an outer skin mounted so as to be able to rotate having a generally immobile adsorption/absorption region or adsorption/absorption section. In this case, the outer skin, can advantageously have flaps which can close or open the sorption section and can be orientated to the wind flow.

In a preferred development of the invention, the device, considered over the cross section, has a substantially equal through-flow depth, so that the moist air, on flowing through, generally flows over the entire cross section past relatively equally many or equally wide retention rails. As a result, the air within the inventive device is relatively uniformly dehydrated.

Preferably, the skin has flaps or vane elements which, as collecting elements, direct atmospheric air into the device according to the invention. If appropriate, the adhesion elements or vane elements are constructed in such a manner that they close one side of the device in the event of disadvantageous climatic conditions. For example, by this means, in the event of sandstorm or the like, in particular together with the skin, protection of the retention rails, air filters etc. can be effected before impairment. As already described above, they can, if appropriate, be orientated in the direction of the wind flow.

Advantageously, at least one air control unit is provided for controlled inflow of air to at least one guide element. By this means, generally, based on the natural wind inflow, in addition relatively moist air can be fed to the guide elements, in particular in the event of wind calm or insufficient wind velocities, so that the water extraction is further improved.

In an advantageous variant of the invention, the adhesion element/guide element or the retention rail is constructed, in particular, as two-dimensional woven fabric, net or the like. Here, use can be made of preexisting elements, preferably commercially available fabrics such as material webs, nets, etc. For example, these woven fabrics or nets can consist of synthetic fibers and/or if appropriate, also of natural fibers. By this inventive variant, a particularly extensive adhesion element or guide element having innumerable individual longitudinal and transverse rails and nodal points can be implemented, by which a particularly large active surface area of the adsorbent/absorbent or saline solution can be achieved. In this case, the individual filaments of the woven fabric or nets can be constructed in such a manner that the saline solution, by means of capillary forces or the like, ensures wetting of the adhesion element or guide element as far as possible over the whole surface.

The distribution element is preferably constructed as woven fabric, net or the like, which in particular is disposed on an inventive plate, e.g. on the rear and/or front of the plate. By this means a layer-like adhesion element or guide element can be implemented. For example, three layers are provided, two outer fabric or net layers, and, disposed in between, an inner, stabilizing, if appropriate shape-giving layer, which consists, e.g., of metal, plastic etc. In an inner layer a heat exchanger is preferably provided which makes available the liberated reaction enthalpy, e.g. of desorption.

In principle, an adhesion element/guide element or a retention rail can have at least one branching element or a switch, so that in the direction of flow of the adsorbent/absorbent or of the saline solution from a single-track a two- or multitrack adhesion element or guide element is formed. By this means an advantageous adaptation to the saline solution volume increase existing along the adsorption/absorption section due to the water uptake can be achieved. Possibly, the cross section of the inventive device, viewed in the vertical direction, exhibits a widening from top to bottom, so that the cross sectional area of the region of the adhesion/guide element or adhesion/guide elements is adapted to the volume increase of the saline solution. For example, the cross sectional area, at least in the region of the adhesion element or guide element, has the form of a cone, truncated cone, triangle, trapeze etc. It is conceivable that as branching element, a substantially horizontally orientated disc is used.

In the variant of the invention in which, as adhesion element or guide element, use is made of a woven fabric, net etc., a branching element or switch can be implemented very particularly simply. For example, two guide elements or fabric webs or nets are fixed to one another or sewn to one another. If appropriate, at different heights of the device, i.e. after different sections in the direction of flow, guide elements or nets or woven fabric webs are fixed or sewn to a substantially continuous woven fabric web or net.

Advantageously, two-dimensional adhesion elements or guide elements such as plates, woven fabrics or nets, can, at least during the adsorption/absorption phase, be orientated in the direction of, or somewhat at an angle to, the air flowing through. As a result, the air flowing through can flow past both the front and also the rear side of the plate, woven fabric web or net, and give off water to the saline solution.

Generally, as hygroscopic salt of the saline solution, selection may be made from very different substances, e.g. sodium chloride, potassium acetate or lithium chloride. The advantageous lithium chloride can absorb water from atmospheric air in part still down to approximately 12% relative atmospheric humidity. In addition, lithium chloride takes up water from the atmospheric air even when there is a covering of the salt with water or saline solution. The absorption of the atmospheric water by the saline solution ends in this case at a ratio of salt to water of about one to four weight units.

Advantageously, in a device for extracting water from atmospheric air having a free flowing adsorbent (3, 13) or an absorbent (3, 13) in particular a saline solution having a hygroscopic salt for the adsorption or absorption of water includes at least one heat exchange unit is provided for utilizing heat energy for desorption. For example, the heat energy of the atmospheric air and/or the reaction enthalpy of the adsorption/absorption is utilized by means of the heat exchanger for the concentration unit or the evaporator, energy supply of the device or the like. By this means an advantageous energy management system can be implemented, so that only a very little external energy needs to be supplied to the device according to the invention by means of wind, sun, a power connection to the public power grid, block-type combined heat and power stations etc.

For example, at least one heat exchanger can be disposed between two adhesion element/guide element plates, within a retention rail rod and/or around numerous adhesion elements/guide elements or retention rails, in particular in the region of the outer skin of the device.

In principle, in the device according to the invention, as far as possible only one fluid or liquid i.e. free-flowing, absorbent is used. A correspondingly free-flowing or liquid absorbent or saline solutions having differing salt concentrations are distinguished by a particularly simple possible transport method. For example, for the active transport of the saline solution, commercially conventional transport devices such as pumps or the like can be used.

In an advantageous embodiment for achieving the object of the invention, the device for extracting water from atmospheric air having a free flowing adsorbent (3, 13) or an absorbent (3, 13) in particular a saline solution having a hygroscopic salt for the adsorption or absorption of water includes a flexible adhesion element or guide element, in particular a string, rope, wire, woven fabric, etc., is provided and/or the device is constructed to be height-adjustable and/or width-adjustable. By this means the device according to the invention can, where required, in particular for mobile applications during the transport phase, be constructed so as to be foldable, collapsible, or folded away. Also the device can be constructed as a device capable of telescoping such as, e.g., currently known tent attachments for cars etc.

Possibly, a liquid store is used for the adsorbent or absorbent, in particular the saline solution, advantageously a water-absorbing or -adsorbing surface of the saline solution being disposed at least on two opposite sides of a wall of the liquid store. By means of this measure, a significant enlargement of the surface actively absorbing atmospheric water is achieved, which leads to an improvement of the yield per unit volume of the device. Possibly, a significantly greater throughput or throughflow of atmospheric air per unit time can be realized than in the prior art, so that the yield per unit time can be correspondingly increased. This leads to a substantial increase in the efficiency and economics of the inventive device.

For example, the liquid or saline solution is stored or disposed in a liquid store or on/above a wall of the liquid store. In this case the saline liquid is also stored on the outside or below the wall of the liquid store, so that the water-absorbing surface is advantageously extensive.

If appropriate, the water-absorbing surface area corresponds to approximately 30% or 50% or 80% of a side surface or of the entire wall. Advantageously, the water-absorbing surface of the saline solution or saline liquid extends at least over virtually an entire side surface or the entire wall. This produces as large an actively water-absorbing surface area of the saline solution as possible. Generally, there is the relationship that the greater the water-absorbing surface area of the saline solution, the more advantageous or greater is the water absorption and/or the efficiency of the inventive device. Generally, maximization of the water-absorbing surface area of the saline solution is to be aimed at, in particular per unit volume.

In a particular development of the invention, the saline solution is fashioned as liquid film or liquid wetting at least at one, or preferably at both, of the side surfaces of the liquid store. As a result a comparatively extensive water-absorbing surface can be achieved. Furthermore, an advantageous ratio of liquid volume to actively water-absorbing liquid surface area is achieved. This leads to a particularly effective water extraction by the device according to the invention.

If appropriate, the inventive water-absorbing surface of the saline solution, to be provided on opposite sides of the wall of the liquid store, is achieved by an overflow, or saline solution flowing over an edge and/or end of the wall and along the outer wall. Alternatively, or in combination therewith, the wall has numerous through-flow orifices for through-flow of the saline solution from a first side to this opposite side of the wall. By this measure, advantageously, an extensive water-absorbing surface, in particular fashioned as liquid film, is fashioned on the side opposite the first side.

In an advantageous embodiment of the invention, the wall is fashioned as mesh, a perforated sheet, a net, a nonwoven, a woven fabric, a membrane and/or a leather hide. Corresponding embodiments of the wall effect in a particularly simple manner a correspondingly advantageous water-absorbing surface. For example in the case of a nonwoven, woven fabric, leather or the like, the extensive implementation of the surface according to the invention is advantageously effected especially by means of capillary forces, surface effects etc.

Advantageously, at least on one side, e.g. on the outer side and/or bottom side of the wall of the liquid store, a distribution element for the two-dimensional distribution of the saline solution is disposed. By this means, the planar fashioning of the liquid film or of the wetting of the wall is advantageously effected.

Alternatively, or in combination to the correspondingly fashioned wall of the liquid store, the distribution element is fashioned as a mesh, a perforated sheet, a net, a nonwoven, a woven fabric, a membrane and/or a leather hide. If appropriate, a layering of the respective layer-type wall having the distribution element is effected. For example, the distribution element is detachably or non-detachably, in particular in a planar manner, fixed to the wall. Possibly, in each case at least one distribution element is disposed on both opposite sides of the wall according to the invention.

Frequently, the liquid store can be fashioned as a vessel, container or the like enclosing at least in part the saline solution. Advantageously, the liquid store is essentially fashioned as planar, substantionally level or flat disc. In this case the saline solution is stored, inter alia, by means of its surface tension, capillary forces or the like. For example, the storage is performed on the topside, viewed in the vertical direction, predominantly by the surface tension or flowability of the saline solution.

In the case of a liquid store fashioned as a disc, in a particularly simple manner, a relatively extensive water-absorbing surface is fashioned. In this case, the inventive water-absorbing surface area can approximately correspond to twice the area of a side of the wall or about to the entire wall area, e.g. including end sides. In addition, a liquid store fashioned as disc can minimize the required construction volume or can maximize the water-absorbing surface area per unit volume. In this case the saline solution can preferably be fashioned as liquid film or wetting on all sides, e.g. not only above, but also below the disc.

In principle, the wall of the store can consist at least in part of porous, in particular sintered, material, so that the volume enclosed or fashioned by the wall is effected as store.

In general, precisely for mobile applications, inventive devices can be integrated in an, e.g., commercially conventional container for trucks, ships etc. For example, at least a part of the container can be fashioned so as to be able to be run out or made (width- or height-) adjustable, so that the adsorption/absorption section can be advantageously lengthened during the sorption phase compared with the idle time of the plant. For example, correspondingly mobile plants can be used locally and very flexibly with respect to time for (potable) water supply after natural disasters, accidents or other impairments or destruction of the general water supply.

BRIEF DESCRIPTION OF THE SEVERAL VIEWS OF THE DRAWINGS

An exemplary embodiment of the invention is shown in the drawing and will be discussed in more detail hereinafter with respect to the figures.

In detail, in the drawings:

FIGS. 4a and 4b show a diagrammatic illustration of an inventive retention rail fashioned as perforated plate with spheres, FIGS. 12a, 12b and 12c show diagrammatic plan views of an inventive device which is alternative to FIG. 11 at different wind strengths

DETAILED DESCRIPTION OF THE INVENTION INCLUDING BEST MODE

Figure 1:
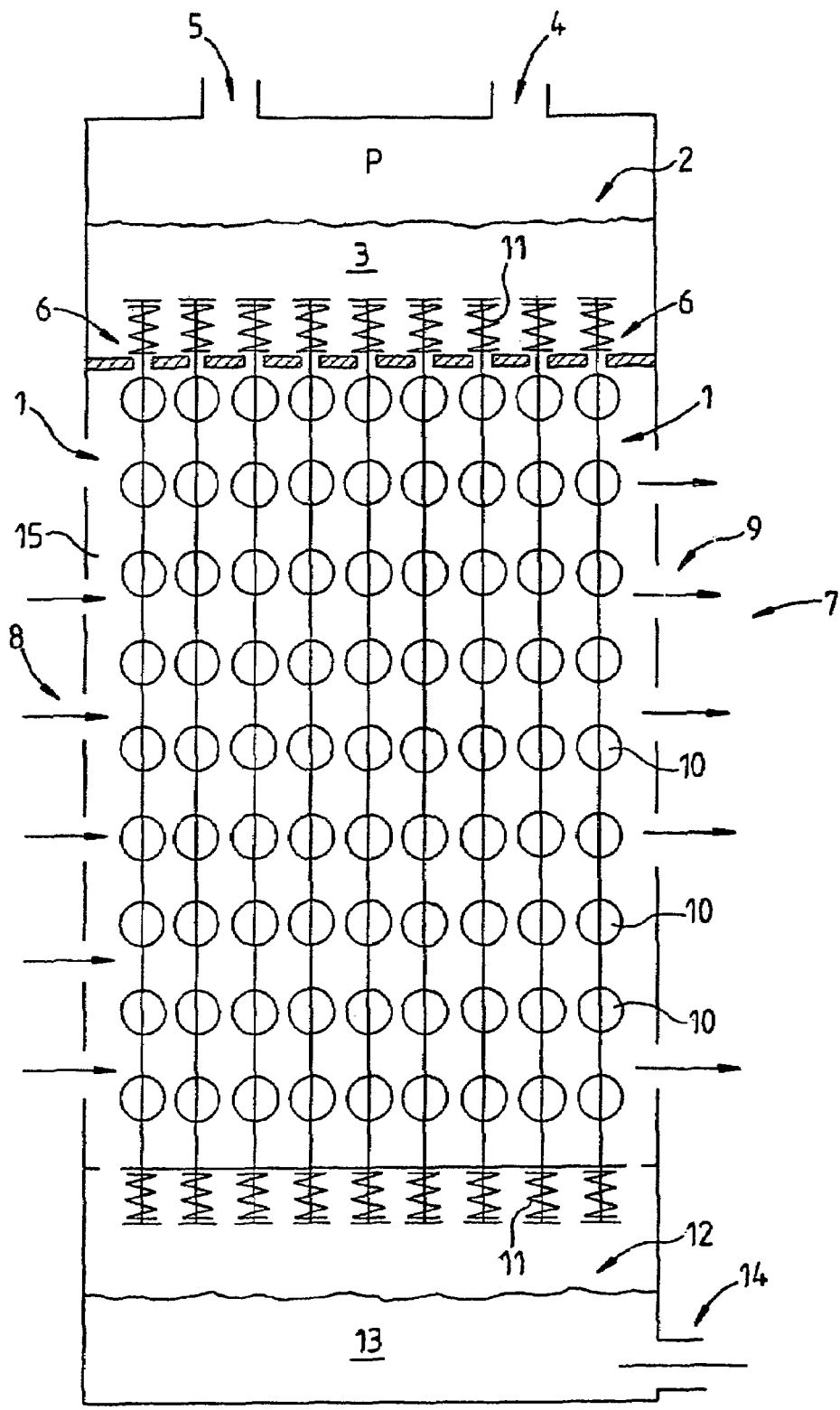
FIG. 1 shows a diagrammatic illustration of a device according to the invention having string-of-pearl-like retention rails.

FIG. 1 shows a device according to the invention having a plurality of adhesion elements/guide elements 1 or retention rails 1 fashioned as a string of pearls 1. In this case, the entire plant can be fashioned, for example, in a comparable manner to, or combined with, the plant or the system according to the device set forth in the prior art or application 103 09 110.6 of the applicant In an upper brine store 2 is stored the virtually saturated saline solution 3. Through a first inlet 4, the saline solution 3, such as e.g. LiCl is charged into the store 2. By means of a second inlet 5 a pressurized medium, e.g. compressed air or the like, is connected to the saline solution 3. The pressure-generation unit which is not shown in more detail produces, in particular a pulsed overpressure in the store 2, so that the saline solution 3 passes through metering orifices 6, e.g. as drops, and flow along the adhesion elements 1 or guide elements 1 downward to an adsorption/absorption region 7, or are conducted downward by the adhesion elements 1 or guide elements 1. The adsorption/absorption region 7 forms the adsorption/absorption section 7 along which the uptake of water from atmospheric air 8 takes place. From the device, somewhat dehumidified air 9 flows.

The retention rails 1 have distribution elements 10 or bodies 10 which ensure an enlargement of the active surface taking up water of the saline solution 3. The string of pearls 1 or guide elements 1 are fixed or tensioned, e.g. by means of springs 11, so that the exact orientation or stabilization of the guide elements 1 is ensured, even at very high flow velocities of the air 8, 9. Without more detailed illustration, a guide element 1 can also be stretched only at the top or bottom by one spring 11.

The pearls 10 or bodies 10 can be fashioned as spheres, ovals, etc. and, for better adhesion of the saline solution 3, be provided with or without grooves, hollows, fibers, small hairs, pores etc. Alternatively, or in combination therewith, they can also be fashioned so as to be roughened or microporous. The bodies 10 can be fashioned from plastic, clay, silica gel, metal, ceramics and/or glass. The exact design of the bodies 10 can be modified to adapt the residence time of the saline solution 1 to its surface.

In the lower region of the device, a second brine store 12 is provided for storing or collecting the saline solution 13 somewhat diluted by the water uptake. The store 12 thus collects the saline solution 13 of the numerous retention rails 1 and delivers this solution 13 by means of an outlet 14 e.g. to a concentration unit which is not shown in more detail, such as an evaporator, membrane unit, cyclone etc. If appropriate, for this a pump can advantageously be used. Possibly, the saline solution 13, in particular upstream of the concentration unit, is at least in part freed from dirt particles by means of a fine filter or the like.

In addition, the device has air filters 15 which substantially retain or filter out from the air 8 particles such as dust, wind-borne sand etc. The pore width of the air filter 15 in this case is advantageously less than the width of the throughway between the guide elements 1 and the orifice 6. This measure very largely prevents blockage of the orifice 6.

Figure 2:
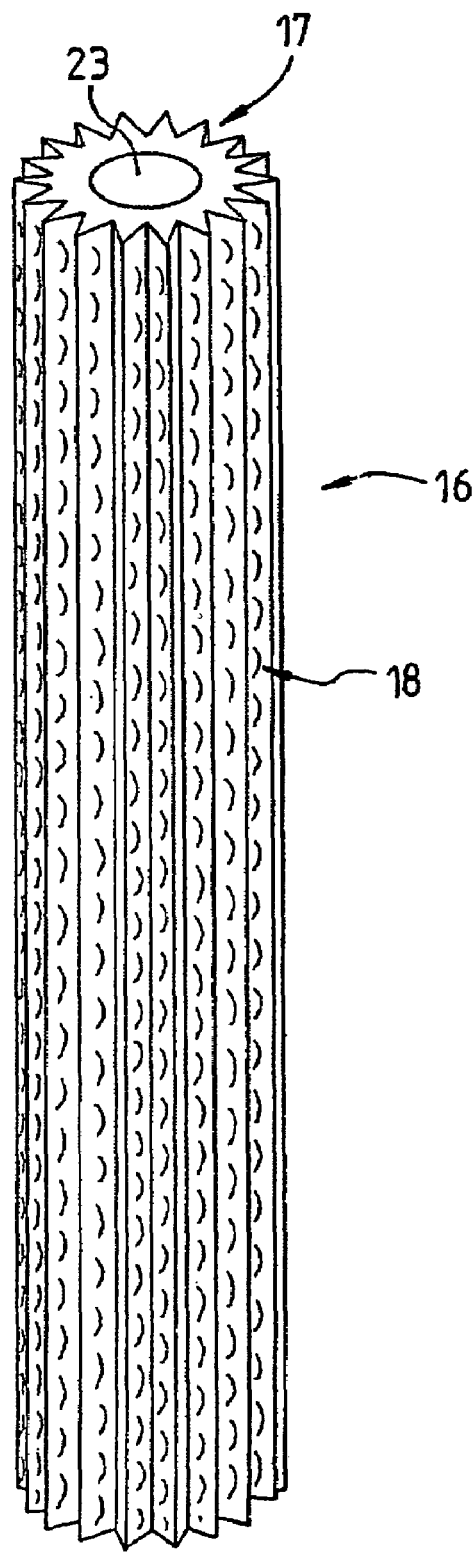
FIG. 2 shows a diagrammatic perspective illustration of an inventive retention rail fashioned as furrowed rod.

FIG. 2 shows a retention rail fashioned as furrowed rod 16. The rod 16 has numerous furrows 17 in which downward-flowing saline solution 3 is conducted. The furrows 17 in addition have a plurality of bulges 18 which enlarge the active surface area and also lead to an extension of the absorption section or increase the residence time in the absorption region 7. Within the rod 16 is provided a part of a heat exchanger 23 which removes the liberated heat of reaction for the desorption.

Figure 3:
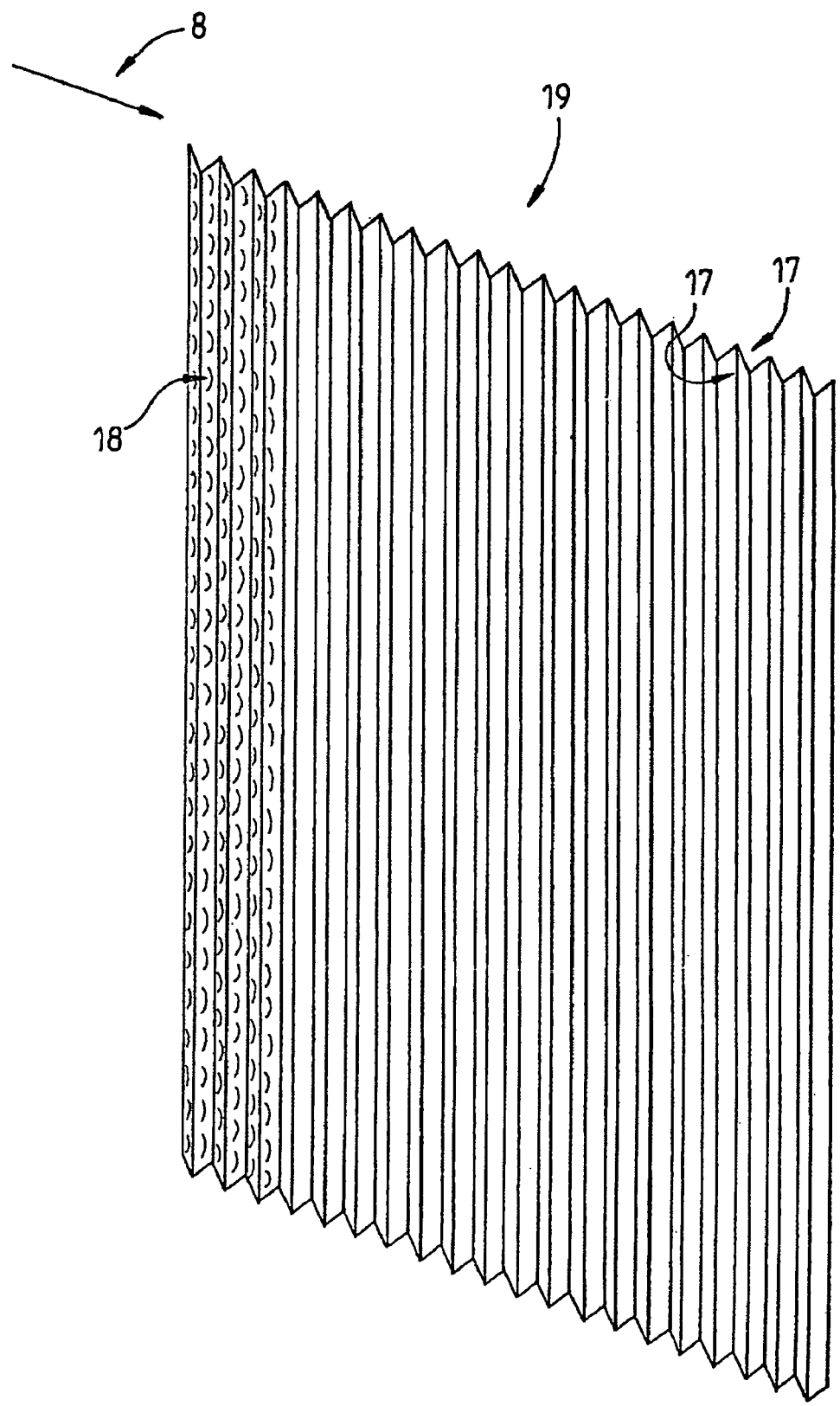
FIG. 3 shows a diagrammatic perspective illustration of an inventive retention rail fashioned as corrugated disc.

FIG. 3 shows a corrugated plate 19 which has numerous grooves 17 in which the saline solution 3 is conducted. The grooves 17 again have bulges 18, so that the active surface area is enlarged and also the residence time of the solution in the absorption region is increased or the flow velocity is advantageously reduced.

According to FIG. 3 it can be seen that the air 8 flows substantially along the plate 19, so that the saline solution 3 preferably flowing down on both sides of the plate 19 can take up water. Corresponding planar adhesion elements 19 or guide elements 19 can generally be orientated or turned into the respective wind direction. The brine or saline solution 3 is fed to the adhesion elements/guide elements or retention rails 1, 16, 19, preferably as drops of saline solution 3, and flows owing to gravity down the track preset by the retention rails into the store 12. For reasons of clarity, no drops are drawn.

Air 8 at a certain atmospheric humidity flows on or past the adhesion elements/guide elements 1, 16, 19, the hygroscopic brine or saline solution 3 in part absorbing the water present in the air 8 and thus being diluted by the dehumidification of the air 8. This means that a salt concentration of the brine or saline solution 3 decreases on the absorption section owing to the water uptake. The salt concentration is the quotient of an amount of salt per unit volume (unit: $g/cm^3$). As salt, use is preferably made of lithium chloride which can remove water from the air 8 as far as an atmospheric humidity of approximately 12%. In addition, lithium chloride can absorb water up to a ratio of one part by weight of salt to four parts by weight of water.

The water vapor of the air 8 is absorbed at a surface of the brine 3. Owing to the relatively large area of the adhesion element/guide elements 1, 16, 19 and the comparatively small store volume, an advantageous surface-volume ratio is effected, so that the water is absorbed particularly efficiently. For example, the brine 3 in this case is stored as a comparatively thin liquid film or wetting on the surface of the adhesion element/guide elements 1, 16, 19 or bodies 10. If appropriate, the saline solution 3 is stored intermediately within a porous or permeable adhesion element/guide element 1, 16, 19 or body 10. In addition, the surface $F_3$ of the drops is fashioned as active water-absorbing surface, so that the absorption is further improved.

The rod 16 or the plate 19 or the bodies 10 each have, if appropriate, a nonwoven, etc., which is not shown in more detail. By this means a distribution of the saline solution 3 as uniform as possible over the entire surface is achieved. This ensures that the water-absorbing surface area is implemented as extensively as possible.

Figure 6:
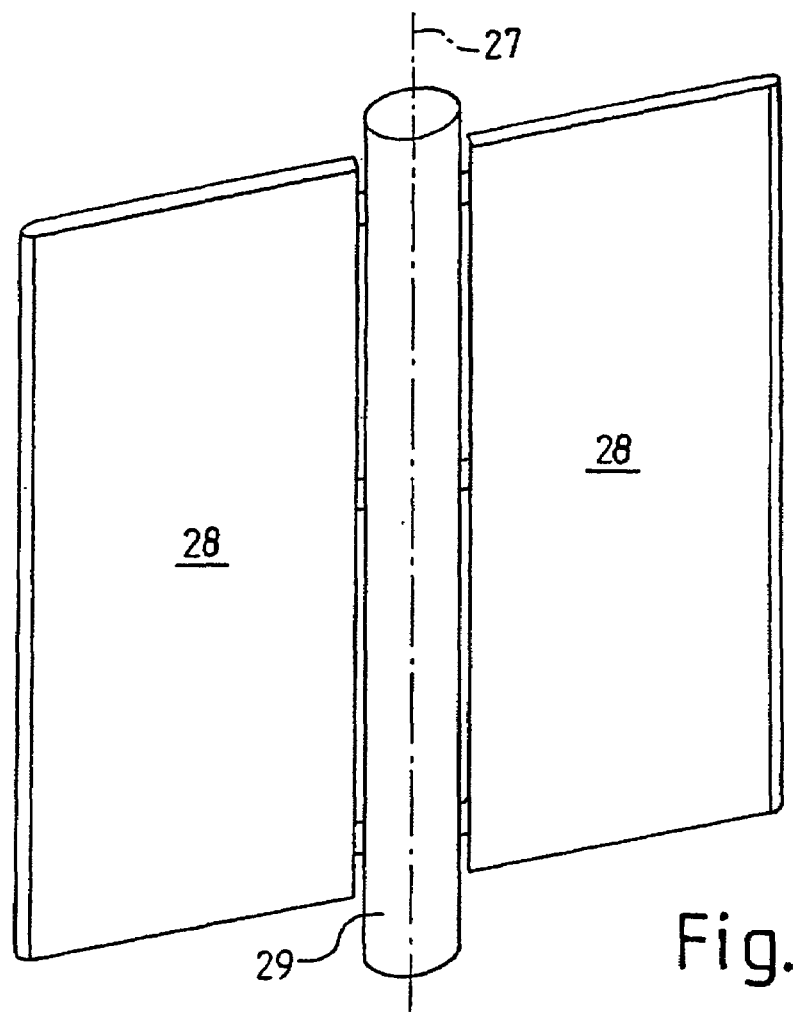
FIG. 6 shows a diagrammatic perspective illustration of a further plant variant according to the invention.

In general, the device according to FIG. 1 or 6 can have a roof, without more precise illustration. On the roof, already commercially conventional elements can be provided for extracting solar energy or supplying energy to the device, e.g. photovoltaic elements and/or solar collectors. In addition, if appropriate, rainwater arising can be advantageously collected by means of the roof and fed to a water store which is not illustrated in more detail. Possibly, the roof which is fashioned, e.g., as a cockpit or the like, can comprise, inter alia, a viewing platform, a restaurant, equipment room and/or control room.

Preferably the saline solution 3 can have additives, e.g. for the prevention of microbial infection, to influence surface tension etc. The brine or saline solution 3, 13 is generally circulated or recirculated and the water taken up is, on passage along the adhesion elements/guide elements 1, 16, 19, advantageously separated off from the brine 3, in particular by means of an evaporator and/or cyclone.

In addition, in principle the air 8 can flow by means of natural flow or movement through the device or along the adhesion elements/guide elements 1, 16, 19 and/or by means of at least one advantageous pressure- or flow-generation unit, such as a fan, a turbine, a blower or the like. In the case of the last-mentioned variant, preferably, at least one flow-directing device is to be provided.

FIG. 4 shows a further variant, which is not true to scale, of a guide element 22, FIG. 4a showing a plan view onto a sphere plane and FIG. 4b showing a cut-away side view onto a plurality of sphere planes. These adhesion elements 22 or guide elements 22 is implemented as a sphere series 22 interrupted a plurality of times, the spheres 24 being arranged in the space by plates 25. The spheres 24 are disposed or fixed on a substantially planar plate 25 orientated in a virtually horizontal plane having numerous orifices 20 or stamped cut-outs 20. The orifices 20 have lands 21, by which the spheres 24 can be fixed. For example, the spheres 24 are pressed and/or glued into the orifices 20.

The air 8 in this variant can flow through the free intermediate space between the sphere 24. In this case the saline solution 3 is conducted along the adhesion elements 1 or guide elements 1 by means of the spheres 24 and distributed over the sphere surface, so that, in particular, a significant enlargement of the active surface area is achieved. The comparatively small vertical distances between two sphere planes and the sphere shape ensures that the brine drops 3 dripping off from a sphere 24 meet a sphere 24 disposed beneath, and thus the vertical guidance according to the invention is implemented.

Figure 5:
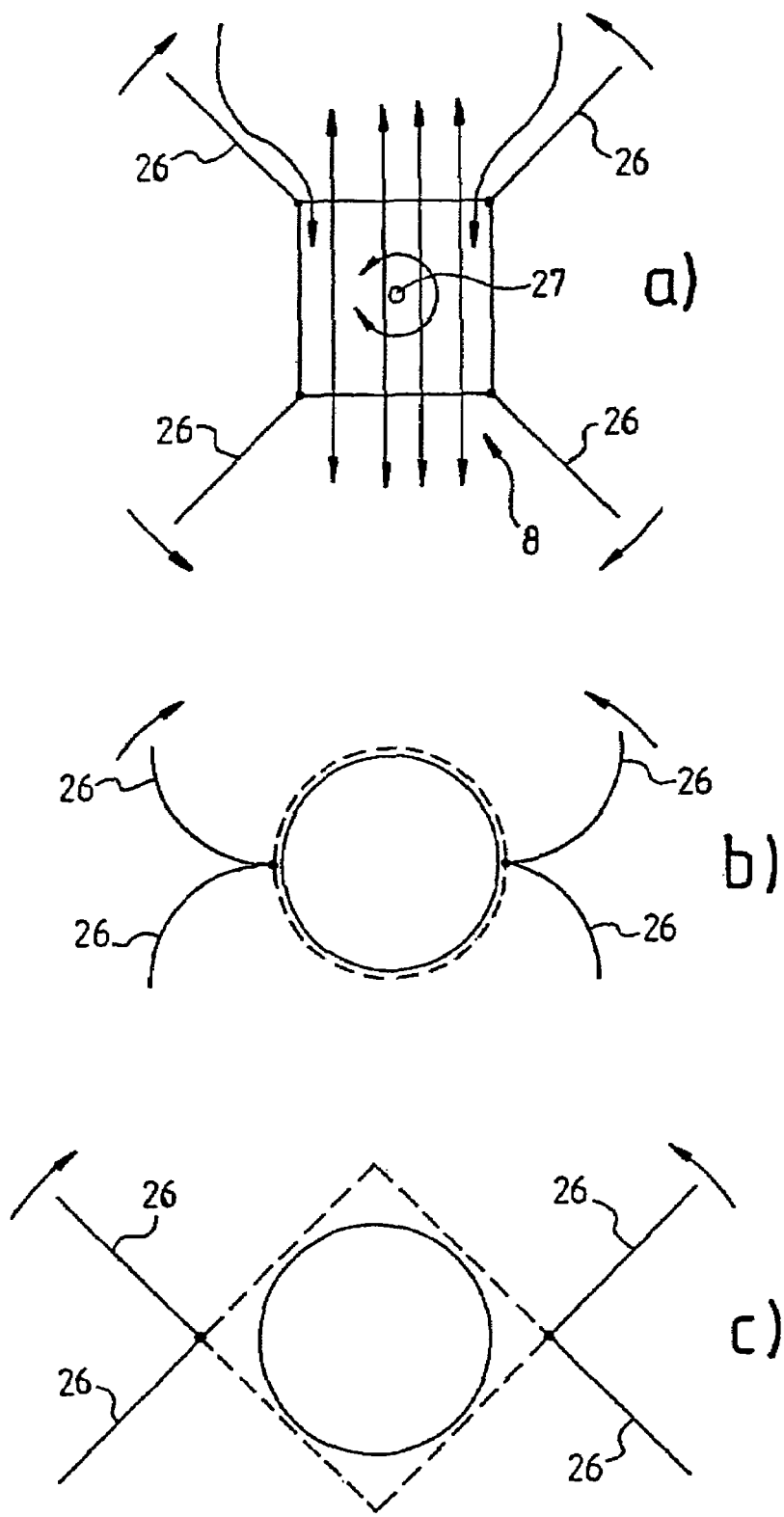
FIGS. 5a, 5b and 5c show a diagrammatic plan view of three plant variants of an inventive device.

FIG. 5 shows three variants of the structure of a device according to the invention in diagrammatic plan view. According to variant 5*a*, the device has a rectangular cross section. The outer skin in this case advantageously has rotatable flaps 26 which can be used, e.g., not only for closing the side walls in the event of unfavorable climatic conditions such as sandstorms, etc., but also for directing or collecting the air streams.

Corresponding constructions (see FIGS. 5*a*, 5*b*, 5*c*; in part without more detailed illustration) are advantageously mounted so as to be able to rotate about a vertical axis 27, especially in the case of two-dimensional adhesion elements, or guide elements, such as vertically disposed plates, fabric webs etc.

According to FIGS. 5*b* and 5*c*, round cross sections of but also square (see FIG. 5*c*) outer skins being able to be implemented. The flaps 26 are adapted in their shape in accordance with the design of the outer skin. Especially in the case of these two variants, the outer skin can be fashioned so as to be able to rotate together with the flaps 26 and the absorption region if appropriate can be fashioned to be immobile.

Figure 7:
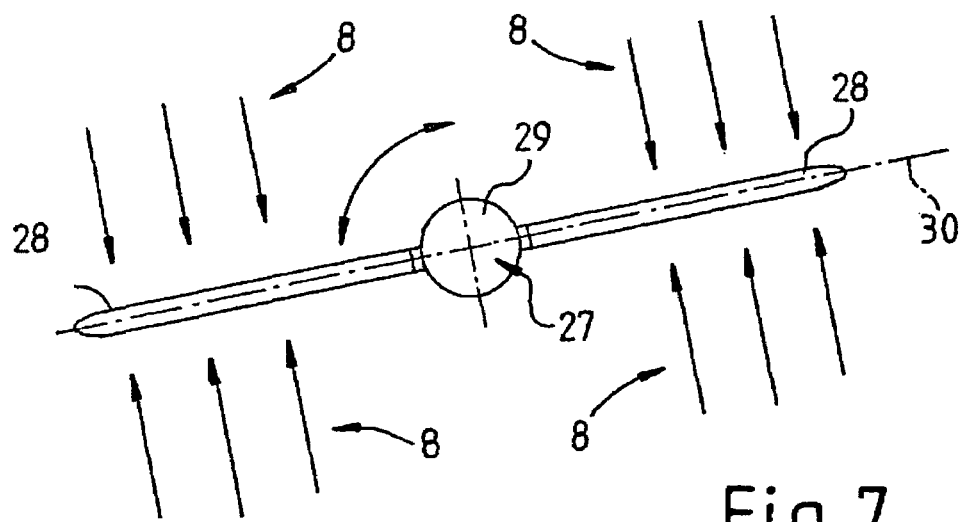
FIG. 7 shows a diagrammatic plan view of the plant variants according to FIG. 6.

In the FIGS. 6 and 7, a further variant of an inventive construction is diagrammatically illustrated. This essentially comprises two vanes 28 and a support column 29. In the patterns 28 shown as vanes 28, numerous adhesion elements/guide elements or retention rails according to the invention are present. For example, the vanes 28 have a depth of some centimeters to some meters and/or a width or a height of if appropriate a plurality of meters. Possibly, the vanes have closing flaps or the like, for example comparable to those from FIG. 5 and/or as lamellae-like strips etc.

The construction or the vanes 28 are advantageously mounted so as to be able to rotate together with or around the column 29 or axis 27. In this case, preferably a pivoting range of about 90° C. is provided so that (inflowing) air 8 can flow virtually perpendicularly to or parallel to the vanes 28, relative to a cross sectional area 30 of the vanes 28.

The perpendicular influent direction is advantageously provided in the operating case of dehumidifying the air 8 and in the case of very high wind velocities, the parallel flow direction of the vanes 28. Possibly, depending on the wind velocity, an (acute) angled orientation of the vanes 28 to the wind direction can be advantageous. The outer ends are advantageously fashioned in a manner expedient to flow or have corresponding wind directing or wind guidance elements.

Figure 8:
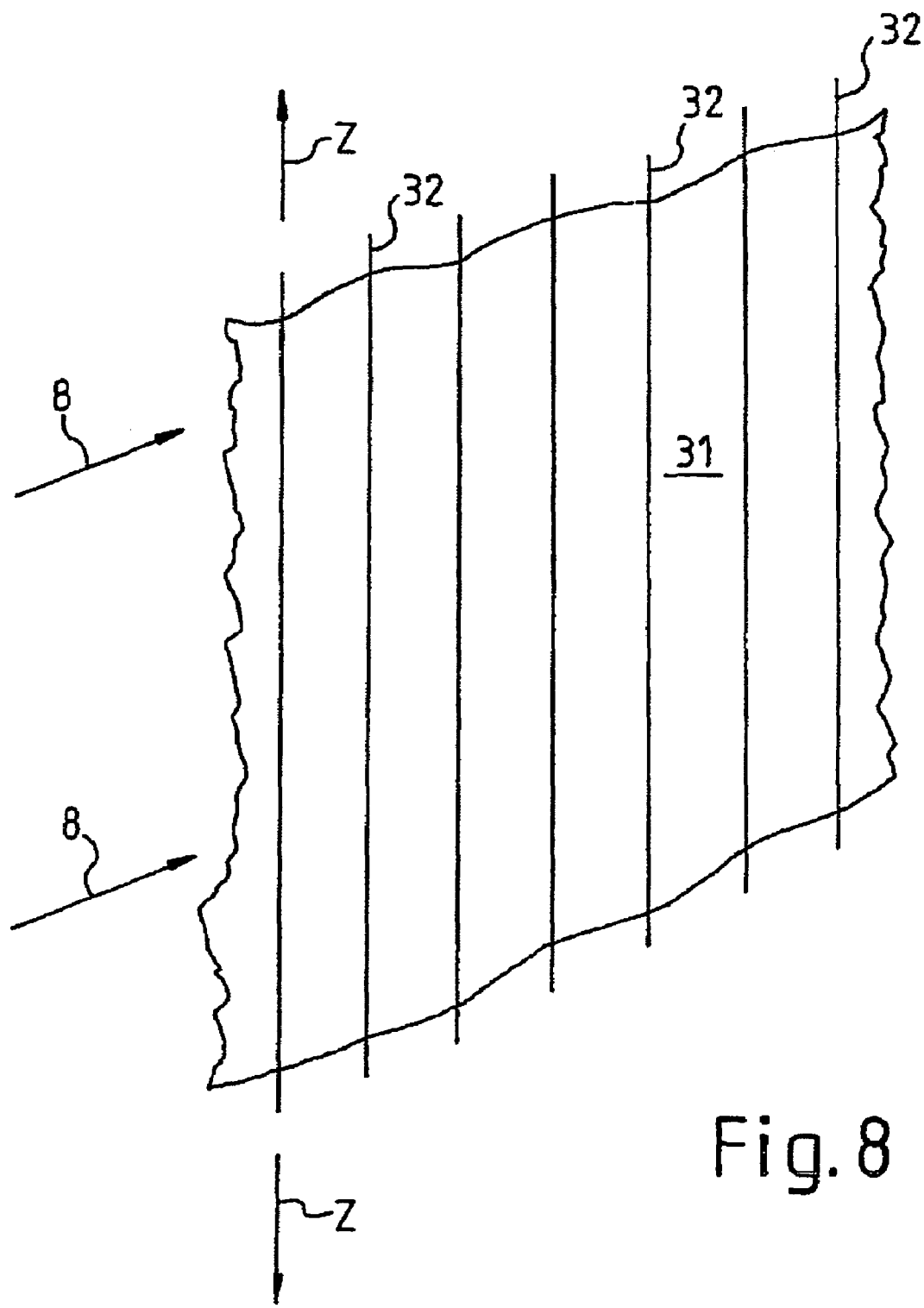
FIG. 8 shows a diagrammatic perspective illustration of an inventive guide element fashioned as woven fabric provided with stretching elements.

A further particular variant of the adhesion element 31 or guide element 31 according to the invention is shown as extract in FIG. 8. The adhesion elements 31 or guide element 31 is in this case fashioned as woven fabric 31 which is traversed or fixed by stretching elements 32. The woven fabric 31 essentially consists of textile woven fabric 31, a net 31, fiber composite 31 or the like. Possibly, in this case, commercially conventional woven fabric 31 is used so that an economically particularly expedient design can be effected.

The stretching elements 32 are fashioned, e.g., as stretching rope or wire cable, rods or the like, which in part penetrate the fabric 31 and/or lie against the woven fabric 31 or support/fix this laterally. Possibly, the woven fabric 31 is disposed between two opposite elements 32. The stretching elements 32 are advantageously fixed at the bottom and also at the top, and stretched without more detailed illustration into the directions Z.

In the case of tensioned stretching elements 32, it is advantageous that if appropriate these can be fashioned at least in part to be flexible or elastic. As a result they are comparatively simple to mount and/or to be fashioned thinly, these nevertheless, by means of the stretching, ensuring an advantageous lateral stabilization of the woven fabric 31. Thus, in particular, relatively elastic or flexible woven fabric 31 can be used.

Figure 9:
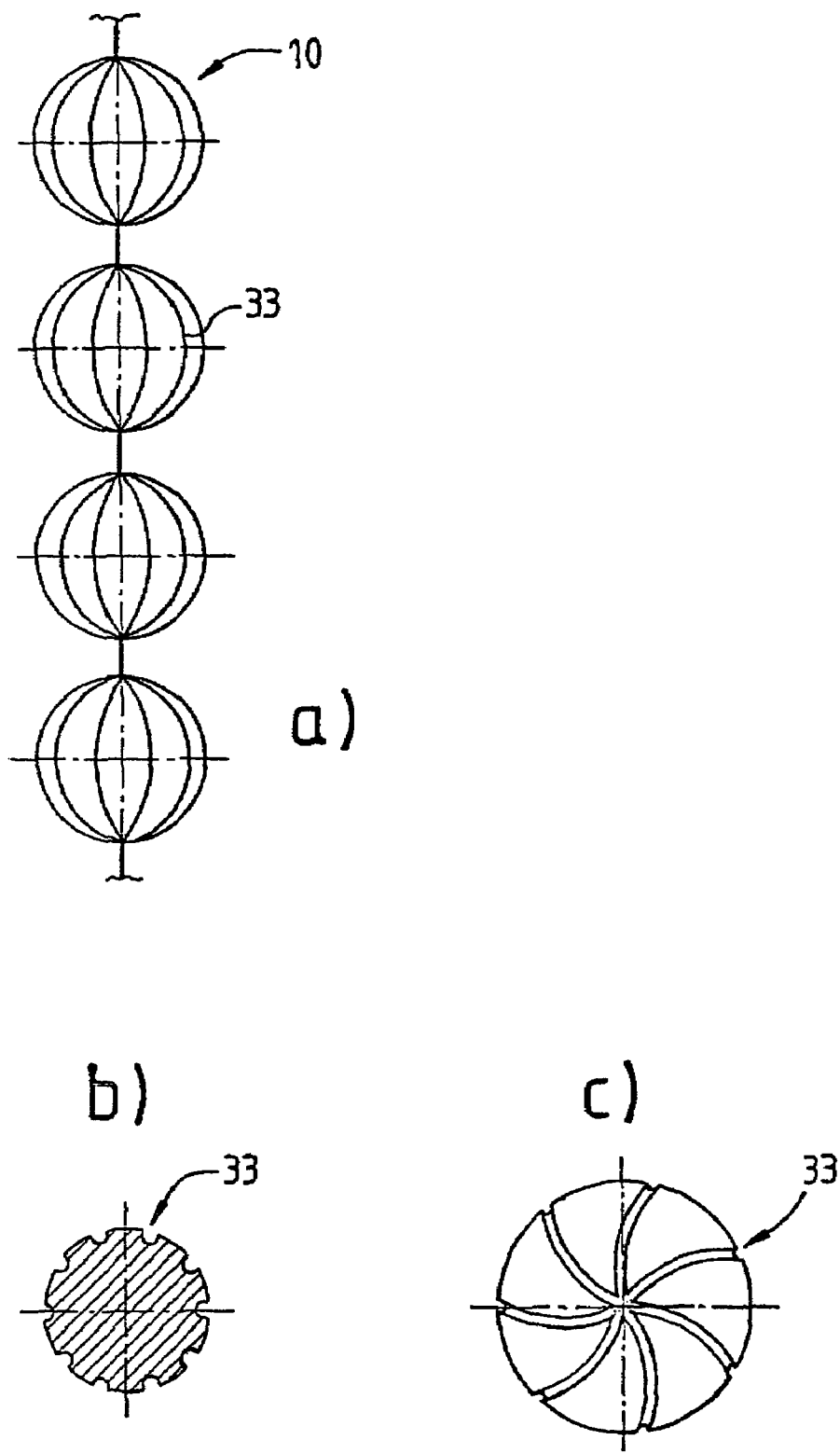
FIGS. 9a, 9b and 9c show diagrammatic views of a further inventive device having string-of-pearl-like retention rails which has fluted pearls.

FIG. 9 shows a further variant of the invention, the bodies 10 being fashioned as spheres 10 having grooves 33. The grooves 33 are preferably implemented in a spiral shape, which is clear, especially in the plan view FIG. 9*c*. As a result a spin or the like of the downward-flowing adsorbent or absorbent can be generated, so that a relatively strong wind does not blow the saline solution exclusively to one side of the body. By this means, even in the event of a comparatively strong wind, a relatively large active surface area of the saline solution is generated which improves the extraction of potable water from atmospheric air. FIG. 9*a* shows a "string of pearls" having bodies 10 which have linear grooves 33. FIG. 9*b* a section through a body 10 having grooves 33.

Figure 10:
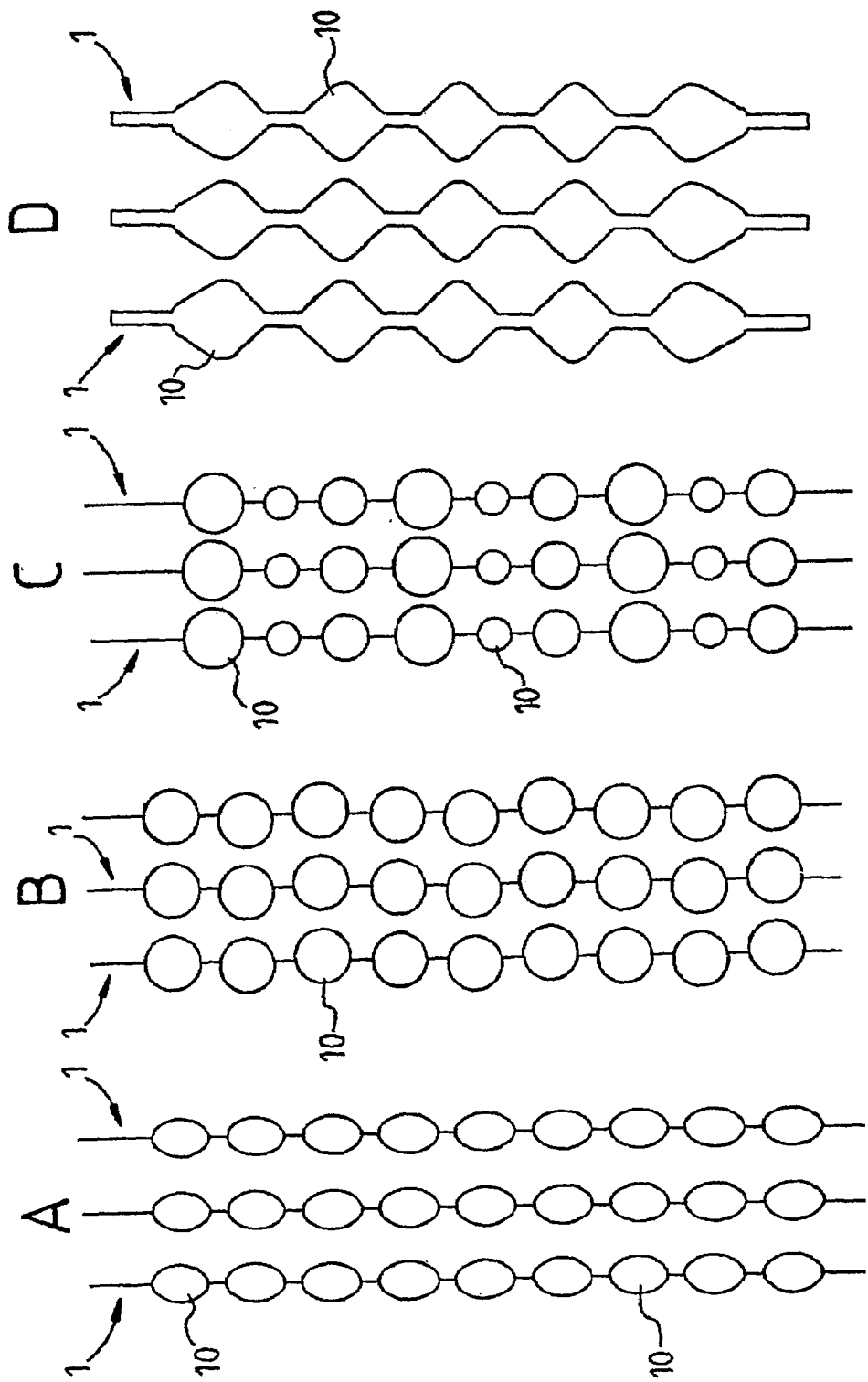
FIGS. 10A, 10B, 10C and 10D show diagrammatic arrangements of different string-of-pearl-like inventive retention rails.

FIG. 10 shows guide elements 1 which are disposed by way of example to form blocks A, B, C, D and have different bodies 10. In the abovementioned variants of the invention, essentially, exemplary spherical bodies 10 are set forth. The bodies 10 of the block A have an oval cross section. The bodies 10 of the block B are asymmetrically disposed on the guide element 1. The bodies 10 of the block C are fashioned to be different sizes. The bodies 10 and also the guide element 1 of the block D are produced by a roller method and preferably have cross sections having different widths. For example, in particular in the case of the last-mentioned variant, spiral or screw-shaped guide rails 1 can be generated.

Generally, guide elements 1 and bodies 10 of any desired structures or shapes can be used and/or be fabricated by any desired production methods. In the case of bodies 10 which have a cross section of differing length and/or are disposed asymmetrically on the guide element 1 and/or are fashioned to be different sizes, it is particularly advantageous that the saline solution advantageously mixes on flowing down. This further improves the absorption/adsorption of the atmospheric water.

Advantageously, the guide element 1 comprises a mixing structure for mixing the absorbent/adsorbent at least during the absorption/adsorption phase or on the absorption/adsorption section. If appropriate, the mixing structure is fashioned in the abovementioned manner.

In principle, it can be advantageous that, in the direction of the wind flow, different, or different numbers per unit ground area of guide elements 1 and/or blocks A, B, C, D are disposed and/or different brine streams or different numbers of brine drops per unit time and/or different brine concentrations are provided. By this means, an advantageous adaptation e.g. to the changing wind strength and/or amounts of water present in the air can be implemented. For example, in the case of the guide element 1 facing the wind, comparatively many brine drops per unit time can be provided, and in the case of the guide element 1 facing away from the wind, relatively few brine drops per unit time can be provided. This means, e.g., at the front relatively much brine flows, and at the rear relatively little brine flows down per unit time on the guide elements 1 or bodies 10.

Preferably, on the wind-facing side of the inventive device or the vanes 28, a lower density of the guide elements 1 is provided than on the side of the inventive device or the vanes facing away from the wind. By this means, firstly adaptation per se to air moistures changing due to the water extraction can be implemented. Secondly, the relatively closely-disposed guide elements 1 on the side facing away from the wind can if appropriate collect brine drops which have drifted off.

Advantageously, on the side of the inventive device or of the vanes 28 facing away from the wind, a collecting device for drifted-off brine is provided. This increases the efficiency of the inventive device and also decreases an impairment of the environment owing to brine which is blown off. Possibly, the collecting device is implemented in the abovementioned manner.

Figure 11:
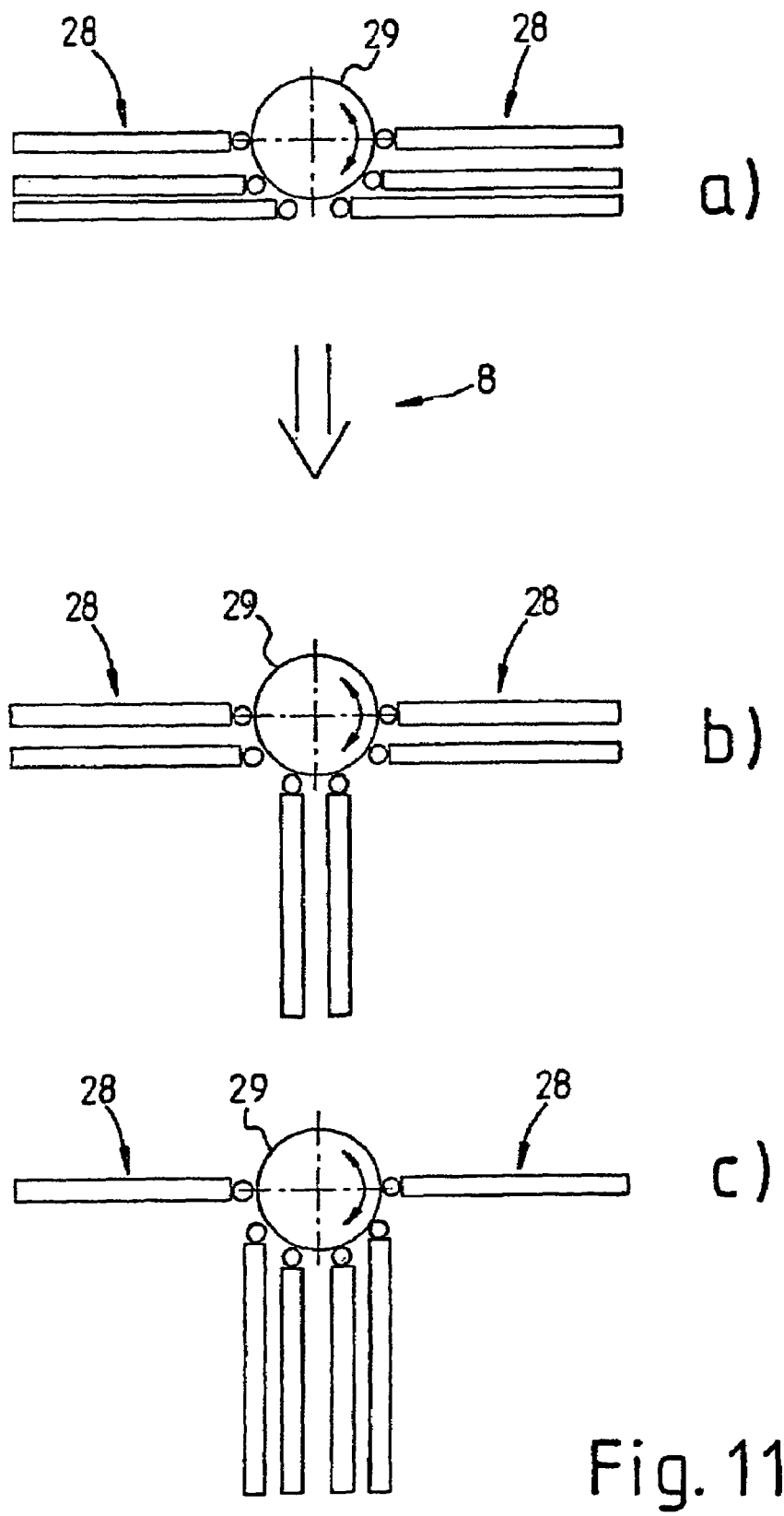
FIGS. 11a, 11b and 11c show diagrammatic plan views of a further inventive device at different wind strengths.
Figure 13:
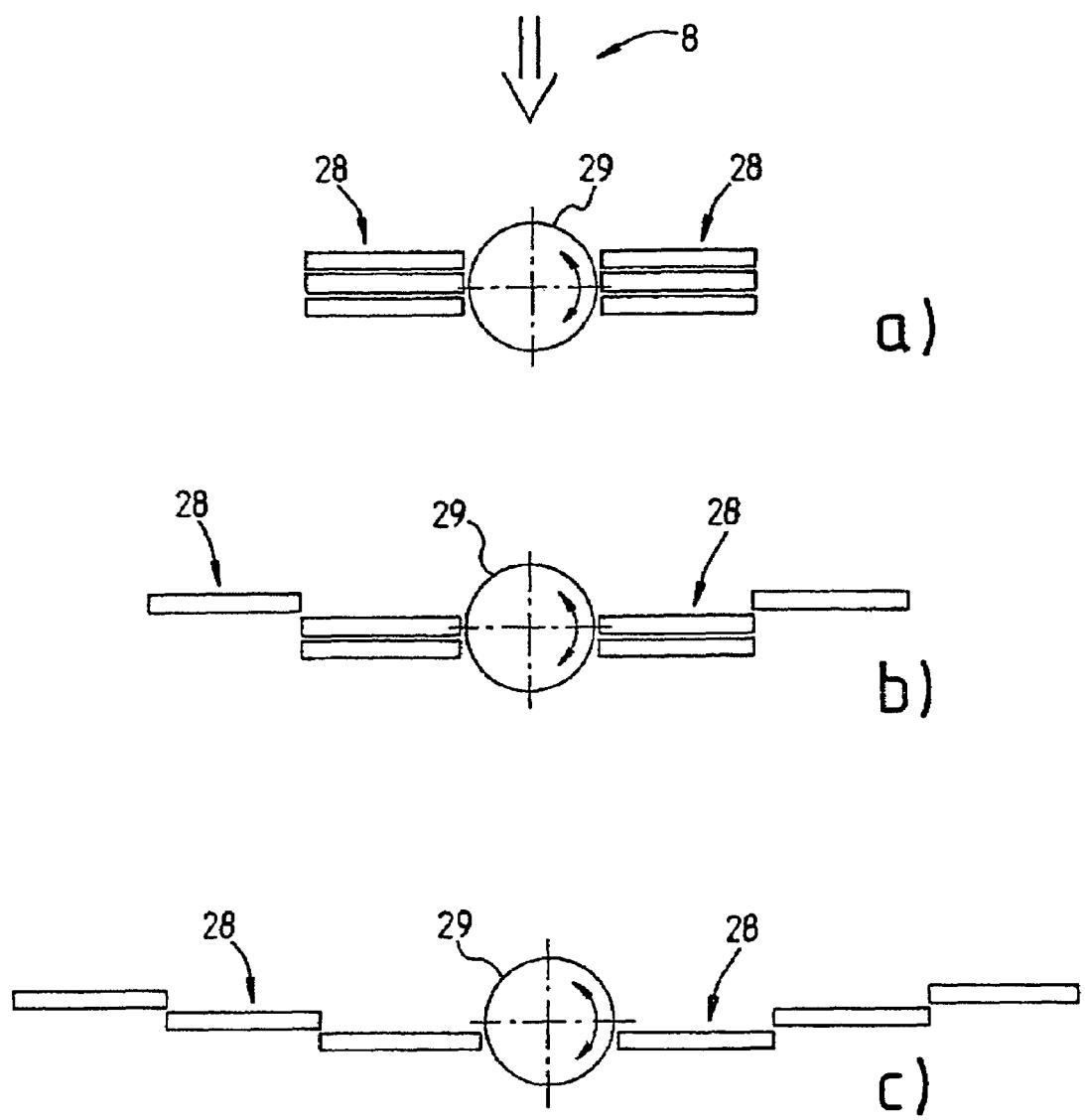
FIGS. 13a, 13b and 13c show diagrammatic plan views of an inventive device which is alternative to FIG. 11 or 12 at different wind strengths.

In the FIGS. 11 to 13, different variants of adjustable or changeable vanes 28 for the inventive device for different wind strengths a, b, c, (storm or strong wind: a; medium wind: b; weak wind or calm: c) are illustrated diagrammatically. In this case the vanes are advantageously adaptable not only to the wind direction but also to the wind strength. In the case of strong wind, the cross sectional area of the vanes 28 through which wind can flow is relatively small and in a weak wind relatively large. On the other hand, the vanes 28 can be orientated into the wind direction by rotating and/or rotating the column 29. By means of these measures, the vanes 28 are protected, in particular from damage by the wind.

The variant according to FIG. 11 has vanes 28 which are fixed on the column 29 so as to be able to rotate by means of a joint or hinge. The column 29 is preferably mounted so as to be able to rotate.

In the case of the variant according to FIG. 12, the vanes 28 are fixed to the column 29 so as to be able to rotate by means of a joint or hinge and in addition have vane sections which are fixed to one another so as to be able to rotate by means of a joint or hinge. In this case, if appropriate, the ability to rotate of the column 29 can be dispensed with.

According to the variant illustrated in FIG. 13, the vanes 28 are formed from respectively moveable or adjustable vane sections. For example, these are vanes 28 in the manner of a sliding door or the like. The column 29 is in this variant preferably mounted so as to be able to rotate. In general, in certain applications, the vanes 28 can be conducted or supported on the ground.

In principle, the entire inventive device and what is termed the "alpha-spring system" can be substantially optimally adapted to the local climatic and energy conditions by computer-controlled measurement and process control. For this, in particular sensors are provided at least for determining a temperature and/or a pressure and/or humidity and/or flow rate and/or the wind direction and/or wind strength and/or operation readiness of individual elements of the device etc.

LIST OF REFERENCE NUMBERS 1 retention rail
2 store
3 saline solution
4 inlet
5 inlet
6 orifice
7 region
8 air
9 air
10 body
11 spring
12 store
13 saline solution
14 outlet
15 air filter
16 rod
17 furrow, groove
18 bulge
19 plate
20 orifice
21 land
22 retention rail
23 heat exchanger
24 sphere
25 plate
26 flap
27 axis
28 vane
29 column
30 surface
31 woven fabric
32 tensioning rope
33 groove
P pressure
Z direction of tension

The invention claimed is:

1. In a device for extracting water from atmospheric air (8) having a free-flowing adsorbent (3, 13) or an absorbent (3, 13) having a hygroscopic salt for the adsorption or absorption of water, the adsorption or absorption being provided at least along an adsorption or absorption section (7) and the free-flowing adsorbent (3, 13) or absorbent (3, 13) is disposed at least along the adsorption or absorption section (7) having a guide element (1, 16, 19, 22, 24) for guiding the adsorbent (3) or absorbent (3) and at least one metering unit (2) having at least one metering orifice (6) for adding the saline solution (3) to the guide element (1, 16, 19, 22, 24) wherein the improvement comprises a metering unit (2) having at least one pressure-generating unit for pressurizing the saline solution (3) disposed in a brine store (2) and a guide element in the form of a string of pearls having numerous bodies.

2. The device as claimed in claim 1, wherein the string for the guide element (1, 16, 19, 22, 24) is selected from the group consisting of a string, rope, wire, woven fabric, chain, tube, rod and pole.

3. The device as claimed in claim 1 or 2 wherein the saline solution (3) is disposed as a liquid film on the guide element (1, 16, 19, 22, 24).

4. The device as claimed in claim 1 wherein the numerous bodies of the guide element (1, 16, 19, 22, 24) provides a flat distribution of the saline solution (3).

5. The device as claimed in claim 1 wherein said numerous bodies are selected from the group consisting of spherical, cubic, conical, oval, egg-shaped, cuboidal and polygonal bodies (10, 24).

6. The device as claimed in claim 1 wherein the string for the guide element (1, 16, 19, 22, 24) is a rod (16) having numerous furrows (17), slots or grooves orientated in the direction of the rod axis.

7. The device as claimed in claim 1 wherein the adsorbent (3) or absorbent (3) has a transport direction orientated along the guide element (1, 16, 19, 22, 24) essentially in a vertical direction.

8. The device as claimed in claim 1 wherein numerous guide elements (1, 16, 19, 22, 24) are provided.

9. The device as claimed in claim 1 wherein the saline solution forms brine drops at least along the adsorption or absorption section (7) for transporting the saline solution (3).

10. The device as claimed in claim 1 further comprising at least one heat-exchange unit for the use of heat energy for the desorption.

11. The device as claimed in claim 1 wherein the device is constructed so as to be height- or width-adjustable.

12. The device as claimed in claim 1 wherein the device is mounted to be at least in part rotatable about an axis (27).

13. The device as claimed in claim 1 further comprising an outer casing mounted to be rotatable about an axis (27).

14. The device as claimed in claim 1 further comprising at least one air filter (15) for filtering the atmospheric air (8) flowing into the device.

15. The device as claimed in claim 1 further comprising an air filter (15) having throughflow orifices, the throughflow orifices having a smaller cross sectional area than the cross sectional area of said at least one metering orifice (6).

16. A method for extracting water from atmospheric air (8) comprising the steps of utilizing a free flowing adsorbent (3, 13) or absorbent (3, 13) for the adsorption or absorption of water and employing a metering unit (2) having a pressure-generating unit to pressurize said free flowing adsorbent (3, 13) or absorbent (3, 13) before adding said free flowing adsorbent or absorbent to a guide element and employing a guide element in the form of a string of pearls having numerous bodies.

17. A device for extracting water from atmospheric air comprising:
   (a) a guide element having a string like or rod like shape bearing numerous pearl sized bodies for guiding a flowable hygroscopic solution;
   (b) a first store disposed at one end of said guide element for holding said flowable hygroscopic solution;
   (c) a plurality of metering orifices disposed between said store and said guide element;
   (d) a pressure generating unit to pressurize said flowable hygroscopic solution in said plurality of metering orifices;
   (e) a second store disposed at the other end of said guide element for storing or collecting a water diluted hygroscopic solution; and
   (f) a concentration unit disposed intermediate said second store and said first store for removing water from said water diluted hygroscopic solution.

18. The device of claim 17 wherein said pressure generating unit is a pulsed pressure generating unit.

* * * * *